US010229457B2

(12) United States Patent
Cicero et al.

(10) Patent No.: US 10,229,457 B2
(45) Date of Patent: Mar. 12, 2019

(54) SYSTEMS AND METHODS FOR IMPLEMENTING TRADING AND GLOBAL MATCHING BASED ON REQUEST AND OFFER OF LIQUIDITY

(71) Applicant: GFI Group Inc., New York, NY (US)

(72) Inventors: Francesco Cicero, London (GB); Simon Prest, London (GB)

(73) Assignee: GFI GROUP INC., New York, NY (US)

(*) Notice: Subject to any disclaimer, the term of this patent is extended or adjusted under 35 U.S.C. 154(b) by 680 days.

(21) Appl. No.: 14/708,451

(22) Filed: May 11, 2015

(65) Prior Publication Data
US 2016/0335719 A1 Nov. 17, 2016

(51) Int. Cl.
G06Q 40/04 (2012.01)

(52) U.S. Cl.
CPC .................... G06Q 40/04 (2013.01)

(58) Field of Classification Search
CPC ........ G06Q 10/00; G06Q 20/00; G06Q 30/00; G06Q 40/00
USPC ...................................... 705/3–44
See application file for complete search history.

(56) References Cited

U.S. PATENT DOCUMENTS

| 6,598,026 | B1* | 7/2003 | Ojha | G06Q 30/0633 |
| | | | | 705/1.1 |
| 7,617,149 | B2* | 11/2009 | Rosenthal | G06Q 40/04 |
| | | | | 705/37 |
| 7,720,742 | B1* | 5/2010 | Mauro | G06Q 40/00 |
| | | | | 705/37 |
| 7,769,657 | B2* | 8/2010 | Chacko | G06Q 30/06 |
| | | | | 705/35 |
| 7,996,296 | B2* | 8/2011 | Lange | G06Q 30/08 |
| | | | | 705/37 |
| 8,126,794 | B2* | 2/2012 | Lange | G06Q 30/08 |
| | | | | 705/36 R |
| 8,332,301 | B2* | 12/2012 | Iyer | G06Q 40/04 |
| | | | | 705/36 R |
| 8,407,138 | B2* | 3/2013 | Imrey | G06Q 20/10 |
| | | | | 705/38 |

(Continued)

Primary Examiner — Frantzy Poinvil

(57) ABSTRACT

Apparatus for stimulating trading in a limited-liquidity financial instrument are provided. One the method may include receiving a trade of liquidity for the limited-liquidity financial instrument. The receiving may include receiving a first order. The first order may correspond to a price and volume associated with a pre-determined bid-offer spread. The order may be executable only in conjunction with a counterorder that trades with the first order and includes a commitment to make a two-way market in the financial instrument at the predetermined bid-offer spread. In certain embodiments, when the first order is received from a first entity and the counterorder is received from a second entity, the method may also include receiving a bid price and an offer price from a second entity. The method may also include receiving an instruction from the first entity to select one of the bid and the offer and to execute a trade therewith. The execution of the trade may be for a size not less than the pre-determined size. If the system fails to receive a selection from the first entity within a pre-determined period of time, the method may further include executing a trade based on a pre-determined election by the second entity of a default trade direction.

12 Claims, 9 Drawing Sheets

(56) References Cited

U.S. PATENT DOCUMENTS

| | | | | |
|---|---|---|---|---|
| 8,577,778 B2* | 11/2013 | Lange | ............... | G06Q 30/08 |
| | | | | 705/35 |
| 8,666,873 B2* | 3/2014 | Dale | ............... | G06Q 40/04 |
| | | | | 705/37 |
| 2004/0024692 A1* | 2/2004 | Turbeville | ......... | G06Q 40/025 |
| | | | | 705/38 |
| 2006/0026090 A1* | 2/2006 | Balabon | ............ | G06Q 40/04 |
| | | | | 705/37 |
| 2006/0136318 A1* | 6/2006 | Rafieyan | ............ | G06Q 30/06 |
| | | | | 705/37 |
| 2008/0040257 A1* | 2/2008 | Nafeh | ............... | G06Q 40/04 |
| | | | | 705/37 |
| 2009/0006266 A1* | 1/2009 | Hanson | ............. | G06Q 20/10 |
| | | | | 705/80 |
| 2010/0185561 A1* | 7/2010 | Torre | ............... | G06Q 40/00 |
| | | | | 705/36 R |
| 2010/0185562 A1* | 7/2010 | Nafeh | ............... | G06Q 40/00 |
| | | | | 705/36 R |
| 2012/0011044 A1* | 1/2012 | Vasinkevich | ......... | G06Q 40/04 |
| | | | | 705/37 |
| 2012/0022995 A1* | 1/2012 | Lange | ............... | G06Q 30/08 |
| | | | | 705/37 |
| 2012/0123891 A1* | 5/2012 | Patel | ............... | G06Q 30/0605 |
| | | | | 705/26.2 |
| 2012/0221453 A1* | 8/2012 | Howes | ............. | G06Q 40/04 |
| | | | | 705/37 |
| 2013/0166475 A1* | 6/2013 | Packles | ............ | G06Q 40/04 |
| | | | | 705/36 R |
| 2014/0316969 A1* | 10/2014 | Imrey | ............... | G06Q 20/10 |
| | | | | 705/37 |
| 2015/0356678 A1* | 12/2015 | Schmitt | ............ | G06Q 40/04 |
| | | | | 705/37 |

* cited by examiner

| Credit | BSz | Bid | Open Mark | Offer | OSz | BSz | Bid | Offer | OSz |
|---|---|---|---|---|---|---|---|---|---|
| ▲ iTraxx S21 5y ☑ | | | | | ⊗ | | | | ⇒ |
| S21 Eur 5y.MTF.ICE | | 56.00 | 56.75 | 57.00 | | | | | |
| S21 Snr 5y.MTF.Bil | | 58.00 | 58.25 | 58.50 | | | | | |
| S21 Xover 5y.MTF.ICE | | 220.00 | 221.26 | 222.50 | | | | | |
| ▲ iTraxx S21 5y GFI-L ☑ | | | | | ⊗ | | | | ⇒ |
| S21 Eur 5y MTF (200m) | 200 | 0.125 | 0.25 | 0.25 | 200 | | | | |
| S21 Xover 5y MTF (50m) | 200 | 0.50 | 1.00 | 1.50 | 100 | | | | |
| S21 Snr 5y BIL (100m) | 100 | 0.60 | 0.50 | 1.00 | 50 | | | | |

FIG. 3

SYSTEMS AND METHODS FOR IMPLEMENTING TRADING AND GLOBAL MATCHING BASED ON REQUEST AND OFFER OF LIQUIDITY

FIELD OF TECHNOLOGY

The present disclosure relates to protocols for trading financial instruments. More particularly, the present disclosure relates to using trading protocols for stimulating human trading activity and preferably enticing traders to trade.

BACKGROUND OF THE DISCLOSURE

Effective electronic trading in financial markets relies on appropriate protocols to optimize the way parties engage and transact. Usually trading occurs by directly negotiating the terms, such as the instrument, the price and the size. Where an instrument is relatively illiquid—i.e., relatively thinly-traded—currently-used protocols fail to adequately address the issue of stimulating liquidity.

Request for Quote ("RFQ") is a protocol that allows brokers and/or traders to engage one another absent substantial liquidity, but RFQ has other limitations. For example, RFQ exhibits a rigid market structure and typically obtains a low-hit ratio.

It would be desirable to offer a hybrid protocol for acting together with known protocols already in use, such as Central Limit Order Book ("CLOB"), Workups/Join the Trade ("JTT"), Matching and Open Market (all trading protocols manufactured by GFI Group, Inc. of New York, N.Y.) order to stimulate liquidity.

It would be further desirable to leverage existing protocols and embed a formal element of commitment into such existing protocols in order to form a hybrid protocol.

SUMMARY OF THE DISCLOSURE

Systems and methods for stimulating trading in a limited-liquidity financial instrument are provided. Some methods may include finalizing a trade of liquidity for the limited-liquidity financial instrument.

For the purposes of this application, a trade of liquidity may be understood to occur between two parties who have committed to a trade in a preferably pre-defined size and via the provision of a bid-offer spread in a preferably pre-determined width. The liquidity seller (also referred to herein, in the alternative, as the market maker) preferably commits to provide the market and the liquidity buyer (also referred to herein, in the alternative, as the market taker) preferably commits to execute a trade at the market maker's term.

The systems and methods may further include receiving a first order. The first order may correspond to a price and volume associated with a pre-determined bid-offer spread. The order may be executable only in conjunction with a counterorder that trades with the first order and includes a commitment to make a two-way market in the financial instrument at the predetermined bid-offer spread.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 3 shows an illustrative display according to certain embodiments;

DETAILED DESCRIPTION OF THE DISCLOSURE

Figure 1:
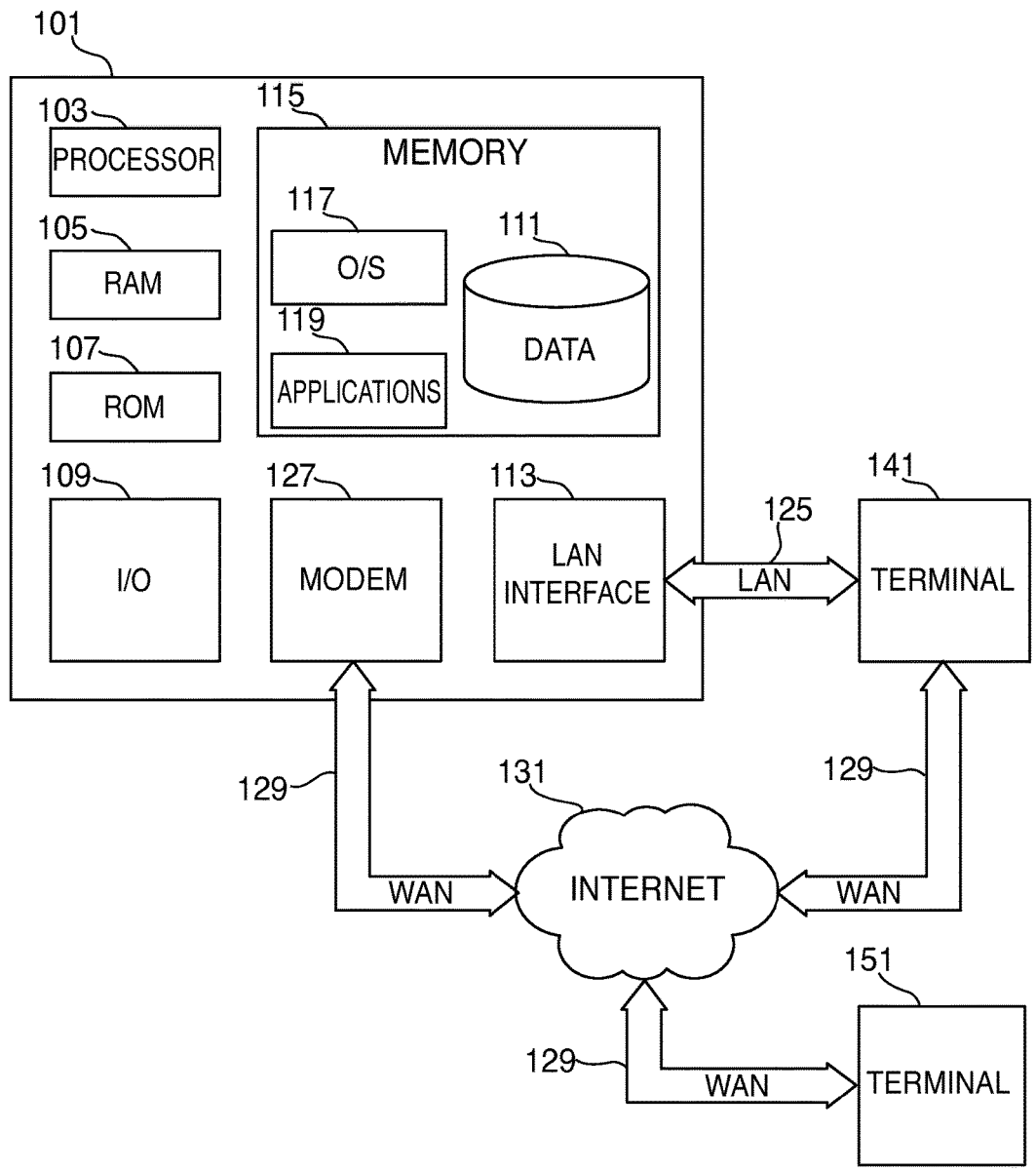
FIG. 1 shows illustrative apparatus in accordance with the principles of the invention.

Embodiments relate to electronic trading systems and methods. Specifically, embodiments relates to systems and methods of trading that may facilitate the searching for, and matching of, market makers and market takers of tradable instruments across preferably all relevant asset classes. Such matching may occur preferably prior to the definition, and preferably the final resolution, of the trading terms between the trading parties. Accordingly, such matching may be implemented in a first stage of a multi-stage trade, as will be explained in more detail below.

One purpose of embodiments described herein is to match buyers and sellers of liquidity in a public marketplace in an underlying tradable instrument. For the purpose of this disclosure, a financial operator that sells liquidity may be referred to as a liquidity market maker, a market maker, or a liquidity provider. The market maker may provide parameters by which he/she expresses an intent to transact either way of a two-way spread of a given tradable instrument in exchange for a guarantee of trading at either his or her bid or offer price in a preferably pre-agreed size, or a size at or more than a preferably pre-agreed threshold size.

A financial operator that buys liquidity by accepting the terms of trade indicated by the liquidity market maker may be referred to herein as a liquidity market taker, or just a market taker.

For the purpose of this disclosure, liquidity is preferably characterized by the width of a 2-way market (a concurrent bid and an offer in a preferably pre-determined size) in the underlying tradable instrument provided by the seller of liquidity to the buyer of liquidity in return for the commitment by the buyer of liquidity of a trade on that 2-way market in the preferably agreed-upon, and/or system-set size.

For the purpose of this disclosure, a public marketplace is a trading venue where entitled institutions may engage each other—whether anonymously or not—to find counterparties to their intended transactions. The marketplace may further enable counterparties to negotiate and finalize the relative terms of trading.

As part of the liquidity transaction, the counterparties are preferably introduced to a price and size transaction in the underlying tradable instrument. The trade in the tradable instrument may form part of a two-phase process. Some embodiments may be advantageous for transactions that are larger in size than standard market size. Such transactions are typically difficult to execute as they may unsettle the underlying market. The unsettling effect may occur with greatest significance if conducted directly in the underlying central limit order book ("CLOB").

Some embodiments may be implemented using multiple concurrent or alternative trading protocols, including CLOB, a Workup/Join-The-Trade ("JTT") session, a Matching session, or an OpenMarket session or substantially any combination of the foregoing.

The liquidity trade according to certain embodiments may preferably set the width of the 2-way market provided by the seller of liquidity (liquidity market maker) to the buyer of liquidity (liquidity market taker). The liquidity trade may also set preferably through negotiations, a volume or size for which the market should preferably be made.

The product scope of the embodiments may include all relevant tradable securities and financial instruments across preferably all asset classes which do not operate on a procurement basis.

The participant scope of the disclosure may include all institutions and/or suitable entities trading financial products across the interested asset classes.

The workflow that forms embodiments claimed herein preferably includes two main phases; preferably sequentially organized as follows, but not necessarily in the order of steps presented below:
  I. Trading of liquidity, resulting in a liquidity trade for an instrument; and
  II. Trading of terms, resulting in the final trade of the instrument at an agreed upon price and size.

As mentioned above, the liquidity trade can be generated via one or more of multiple trading protocols, including a central limit order book ("CLOB"), a Workup/Join-The-Trade session, a Matching session, or an OpenMarket session.

CLOB Liquidity Trade Workflow:

In certain embodiments of the liquidity trade within the CLOB liquidity trade workflow, the instrument that is to be traded can be displayed in two versions. Each of the versions is preferably uniquely identified. One version is for the liquidity trading workflow described below in the portion of the specification corresponding to FIG. 3, FIG. 4A and FIG. 4B.

The instrument set up for liquidity trading may preferably offer participants the option to submit a bid to receive liquidity or an offer to provide liquidity. The bid for liquidity may include a width of a bid-offer spread as well as a size of a market that accompanies the width. An offer to provide liquidity may include a width of a bid-offer spread as well as a size of a market that accompanies the width.

In certain embodiments, there may be a minimum size imposed on the liquidity trading instrument, different from the minimum size imposed on the standard instrument.

The submitted bids and offers may be displayed to entitled participants.

In certain embodiments, the market taker buying liquidity may submit a default directional choice for trading in the subsequent "trading of terms" phase. This will also be explained in more detail below in the portion of the specification corresponding to FIG. 3.

Workup/JTT Liquidity Trade

A workup/JTT session is preferably triggered by a CLOB trade. Preferably, the price level that has been traded in the CLOB can be the mid-level advertised in the session. Examples of JTT trading are set forth in commonly-owned U.S. Pat. No. 8,032,443 which is hereby incorporated by reference herein in its entirety.

The instrument that is being traded can be displayed in two trading screen versions. Preferably, each trading screen is uniquely identified. One version relates to the liquidity trading workflow, and one version relates to the trading of terms.

The instrument set up for liquidity trading can preferably offer participants the option to submit a bid to receive liquidity or an offer to provide liquidity. The bid may be for a particular width—i.e., a width of a 2-way market that the market maker is willing to make in return for the market taker trading a pre-determined amount of the interest at a preferably pre-determined price.

There may be a minimum size imposed on the liquidity trading instrument. The minimum size imposed on the liquidity trading instrument may be different from the minimum size imposed on the standard instrument.

The submitted bids and offers may be displayed to all or some of the entitled participants, or left undisclosed. Furthermore, there may be a directional indicator about the open interest in the session. For example, when there are sellers of liquidity in the session the system may display preferably only a dedicated participation indicator, such as an asterisk or other visual indicator, on the seller side for all entitled participants to see.

In addition, the market taker buying liquidity may include in his or her offer to sell liquidity a default directional choice for trading in the subsequent trading of terms phase.

Matching Liquidity Trade

A matching session may be triggered by the administrator of the marketplace and subject to a timer. The mid-level price disclosed in the session may also be defined by the administrator or may be system-set.

As in the previous protocols, the instrument to be traded can be displayed in two versions preferably uniquely identified; one for the liquidity trading workflow, and one for the trading of terms described below.

The instrument set up for liquidity trading can preferably offer participants the option to submit a bid to receive liquidity or an offer to provide liquidity. The bid or offer is typically set forth in terms of a width of a two-way market and a size.

There may be a minimum size imposed on the liquidity trading instrument. The minimum size imposed on the liquidity trading instrument may be different from the minimum size imposed on the standard instrument.

The submitted bids and offers may be displayed to entitled participants, or left undisclosed. Furthermore, there may be a directional indicator about the open interest in the session. For example, when there may be sellers of liquidity in the session the system may display a dedicated participation indicator on the seller side for all entitled participants to see.

The market taker buying liquidity may submit a default directional choice for trading in the subsequent "trading of terms" phase.

OpenMarket Liquidity Trade

An OpenMarket session may be triggered by the administrator of the marketplace and may run in parallel to the liquidity CLOB. The mid-level price disclosed in the session may be defined manually by the administrator or may be system-set. Open Market trading is described in more detail in co-pending, commonly-assigned U.S. patent application Ser. No. 13/826,963, entitled "Systems and Methods For Implementing Trading and Global Matching Based on Broker-Suggested Prices," filed on Mar. 14, 2013, which is herein incorporated by reference in its entirety.

The instrument that is to be traded may be displayed in two preferably uniquely identified versions: one for the liquidity trading workflow; and one for the trading of terms described below.

The instrument set up for liquidity trading can offer participants the option to submit a bid to receive liquidity or an offer to provide liquidity.

There may be a minimum size imposed on the liquidity trading instrument which may be different from the minimum size imposed on the standard instrument.

The submitted bids and offers may be displayed to entitled participants, or left undisclosed, or there may be a directional indicator about the open interest in the session—e.g., there are sellers of liquidity in the session and the system displays a dedicated participation indicator on the seller side for all entitled participants to see.

The market taker buying liquidity may submit a default directional choice for trading in the subsequent trading of terms phase.

Trading of Terms

Once a buyer and a seller have been matched in a liquidity trade at a pre-determined width in a preferably agreed-upon size, the seller of liquidity—i.e., the market maker—can receive a prompt to generate a 2-way market with the distance between bid and offer equal to the value transacted in the liquidity trade—e.g., 0.50 basis points—or to some other suitable value. The size will preferably be pre-populated and may be based on the size that has been agreed upon as part of the liquidity trade or some other suitable size.

The price of the bid and offer for the 2-way market is preferably also part of the communication from the market maker to the market taker. The prices are preferably not yet submitted to the public market prior to the market taker executing one side of a 2-way market in at least a size that corresponds to the agreed-upon size of the liquidity trade.

The prompt may be a section of the main trading system user interface, a popup, a data feed available via an application programming interface ("API"), or a message communicated via any suitable alternative method.

In certain embodiments, the market maker may be subject to a time constraint, in order to minimize the chance that market conditions affect the proceedings of the negotiation. The time constraint may be as short as a few seconds or as long as many minutes. The time constraint may be set by an administrator or may be system-set. The time constraint may be static, or may be dynamic and/or based, for example, on volatility in the interest or some other suitable metric.

If a market mid-level price is available or obtainable at the time, the market maker prompt may be pre-populated preferably with a default, perfectly symmetrical 2-way market—e.g., the mid-level price is 60 and the agreed width is 0.5, resulting in a default 59.75/60.25 market.

As the embodiments typically rely on the guarantee of liquidity and commitment to trading from the parties, some of the embodiments may not include the ability to withdraw from the market making once the market taker has executed a trade on one side of the market.

Once the market maker has entered the 2-way market or left it to the default values generated as described above in this section and submitted, via one of the prompts described above in this section, the availability of the 2-way market may preferably trigger a prompt for the buyer of liquidity, who will be presented with the terms of trading.

Similar to the prompt generated for the market maker, the prompt for the market taker may be a section of the main part of the trading system user interface, a popup, a data feed available via an API, or a message communicated via any suitable alternative method.

For the purpose of this invention, the terms of trading refer to all the parameters such as unique instrument identifier, price, size, direction, and/or other possible terms under the standard definition of the tradable instrument. Such terms are typically required to be presented to the market taker in order to provide a clear description of the transaction scheduled to occur.

For market fairness, in some embodiments, the market taker may be subject to a time constraint, in order to minimize the chance that market conditions affect the timing of the negotiation. The time constraints may be as short as a few seconds or as long as a many minutes.

As the embodiments relate to commitment to trading from the parties, some embodiments may preferably not include the ability to withdraw from the market-taking phase.

The market taker may preferably be presented with two options: one to buy at the market maker's offer price, and one to sell at the market maker's bid price. The market taker may preferably be expected to make a choice and submit it within the time constraints imposed on him or her.

In certain embodiments, should the market taker not submit a choice to buy or sell manually within the designated time, if a default choice of the market maker's preferred trade direction is available, a trade may, in certain circumstances, be finalized automatically.

In certain embodiments, should the market taker not submit a choice to buy or sell manually within the designated time, and if a default choice is not available and/or known, the market maker may not be able to change and resubmit his 2-way market.

In consideration of the fact that traders may be off the desk in the short period of time during the trading of terms phase, should the terms not be traded and the overall workflow not be completed because the market mid-level price was not available and either the market maker or market taker did not submit in time, the process may transition to an untimed state monitored and enforced by the administrator of the marketplace. In such a state, the trading of terms can be resumed once the relevant participants are available to resume and finalize the trade.

Should the 2-way market be automatically generated, also as described above in this section, and the market maker elects to not submit an alternative market manually (or simply omits a manual intervention), the automatically generated 2-way market may preferably be submitted (with or without the default direction specified by the market maker prior to communication with the market taker).

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art upon reading the following disclosure, the embodiments may be embodied as a method, a data processing system, or a computer program product. Accordingly, the embodiments may take the form of an entirely hardware embodiment, an entirely software embodiment or an embodiment combining software and hardware aspects.

Furthermore, embodiments may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Exemplary embodiments may be embodied at least partially in hardware and include one or more databases, receivers, transmitters, processors, modules including hardware and/or any other suitable hardware. Furthermore, operations executed may be performed by the one or more databases, receivers, transmitters, processors and/or modules including hardware.

FIG. 1 is a block diagram that illustrates a generic computing device 101 (alternately referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of server 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternately, some or all of server 101 computer executable instructions may be embodied in hardware or firmware (not shown). As described in detail below, database 111 may provide storage for mid-price information input into one or more of the database(s) described herein, as well as bid information, offer information, trade information, market making information, etc.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages via the World Wide Web from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

A terminal such as 141 or 151 may be used by a user of the embodiments set forth herein. Information input may be stored in memory 115. The input information may be processed by an application such as one of applications 119.

Figure 2:
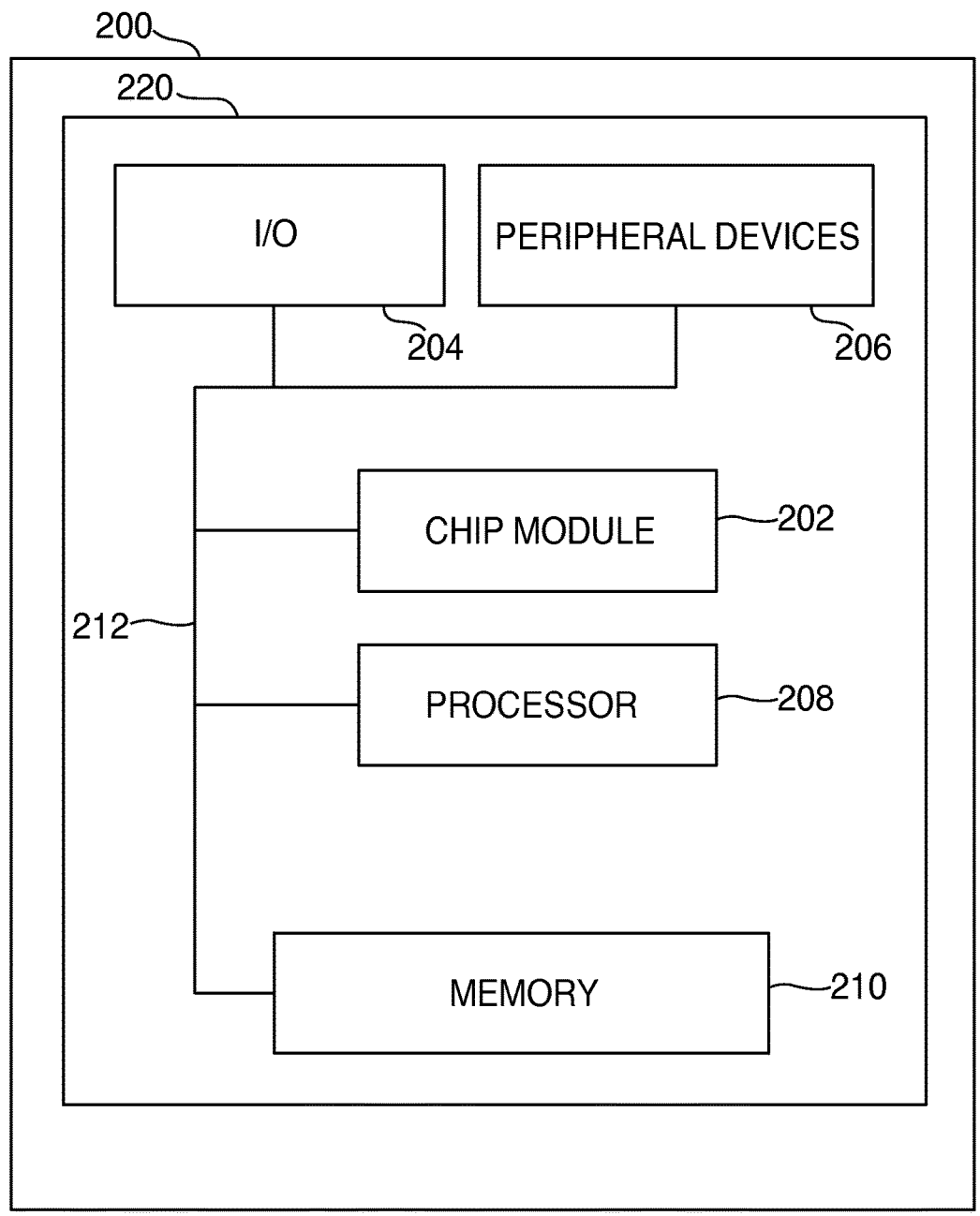
FIG. 2 shows another illustrative apparatus in accordance with the principles of the invention.

FIG. 2 shows an illustrative apparatus that may be configured in accordance with the principles of the invention.

FIG. 2 shows illustrative apparatus 200. Apparatus 200 may be a computing machine. Apparatus 200 may be included in apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include the transmitter device and the receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device ("processor") 208, which may compute data structural information, structural parameters of the data, quantify indicies; and machine-readable memory 210.

Machine-readable memory 210 may be configured to store in machine-readable data structures: data lineage information; data lineage, technical data elements; data elements; business elements; identifiers; associations; relationships; and any other suitable information or data structures.

Components 202, 204, 206, 208 and 210 may be coupled together by a system bus or other interconnections 212 and may be present on one or more circuit boards such as 220. In some embodiments, the components may be integrated into a single silicon-based chip.

Apparatus 200 may operate in a networked environment supporting connections to one or more remote computers via a local area network (LAN), a wide area network (WAN), or other suitable networks. When used in a LAN networking environment, apparatus 200 may be connected to the LAN through a network interface or adapter in I/O circuitry 204. When used in a WAN networking environment, apparatus 200 may include a modem or other means for establishing communications over the WAN. It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to operate processor 208, for example over the Internet.

Apparatus 200 may be included in numerous special purpose computing system environments or configurations.

FIG. 3 shows illustrative display 301. Display 301 may be a GUI.

Display 301 may be displayed to market maker. Display 301 may be displayed to a market taker. Portion 350 may be for a conventional trade of various financial instruments, include a Euro 5Y contract, an Snr 5Y contract, and/or an Xover 5Y contract. Portion 360 may be for a liquidity trade in the same, or different, contracts.

Display 301 may display one or more orders such as bids and offers, which may be used to form matches. In the liquidity portion 360 of GUI 301, matches may be formed between market makers and market takers.

Display 301 may include column 303. Column 303 may display the financial instrument to be traded.

Display 301 may include column 305. Column 305 may display the bid size for one of financial instruments in column 303, with respect to portion 350, or the bid size for making taking the market, with respect to portion 360. For example, column 305 may display a bid size of one million notional dollars, one hundred million notional dollars, or any other suitable value.

Display 301 may include column 307. Column may list a bid price for the bid size for the financial instrument in column 303.

Display 301 may include column 309. Column 309 may display a price. The price may be a trading price of the financial on the open market. For example, one financial instrument may be trading at 56.75 on the open market, while another may be trading at 58.25 on the open market. The open market price may be a market price as determined by an administrator or as determined by a system. The open market price may be a mid-level price which may represent the market at a particular time.

Display 301 may include column 311. Column 311 may list an offer for the financial instrument in column 303, with respect to portion 350. Column 311 may list an offer for liquidity for the financial instrument in column 303, with respect to portion 360. The party offering liquidity would be the market maker.

Display 301 may include column 313. Column 313 may display an offer size. The (x) on the FIG. proximal to the order indicates that the order is cancellable (typically by the user who input the order.) In certain embodiments, selecting the (x) on the screen will cause the order to be cancelled.

Display may include trading category 323. Category 323 may include one or more financial instruments trading on the open market, such as Snr 5y 325. Snr 5y 325 may include open market price 327.

Display 301 may display market width 333. Market width 333 may be a price window within a predefined distance of, or symmetrically about, a mid-level price.

For example, display 301 may display market width 333, displaying a 0.25 basis point width set by the system. The width may preferably set the width of the market to be made by the market maker.

In addition, the width may set values for the pricing of the trade of terms to following the liquidity trade.

For example, the open market price for the S21 EUR 5y may be 56.75. The system may set a 0.25 market width. Assuming that the trade of terms must be at least partially within a single width of open market price, such a market width sets the lowest quotable two-way market at 56.25 for a bid and 56.50 for an offer. In a further example, the highest quotable two-way trade would be a bid of 57 and an offer of 57.25.

Columns 315, 317, 319 and 321 are commonly referred as a blotter area and can be used to enter and/or manage user orders. Nevertheless, these areas do not necessarily form part of the scope of the invention set forth herein.

Figure 4A:
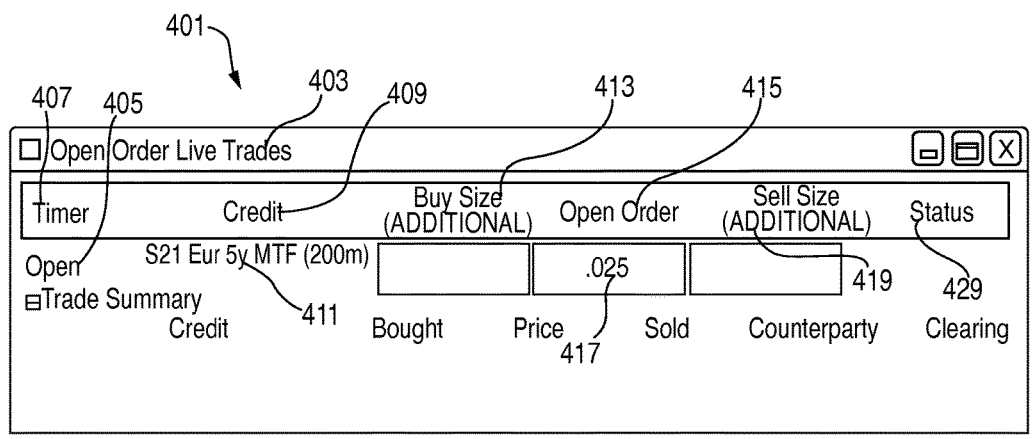
FIGS. 4A and 4B shows another illustrative display according to certain embodiments.

FIG. 4A shows illustrative display 401. Display 401 may be a GUI. Display 401 may be a pop up window or dialog box. Illustrative display 401 may enable the trading of liquidity.

Display 401 may include text 403. Text 403 may indicate the legend, such as an "open order live trade."

Display 401 may include timer 407. Timer 407 may display if an order is open, as displayed in box 405.

Display 401 may include Column 409. Column 409 may display the type of financial instrument, such as EUR 5y in box 411.

Area 411 may include a bid or offer for a predetermined quantity of the financial instrument, such as two hundred million, or any other suitable quantity. The bid or offer may be system-set and/or user-input. The bid or offer may preferably enable parties to negotiate a trade of liquidity, as initiated by the screen shown in more detail in portion 360 of FIG. 3.

Display 401 may include buy size 413. Buy size 413 may be used to indicate a desire to bid or offer additional quantities of the financial instrument—e.g., quantities in addition to the quantity indicated in area 411. Such additional quantities may be in addition to the minimum size required by the trade of liquidity.

Display 401 may include open order 415. Open order 415 may display the market width, such as market width 417, displayed as 0.25.

Display 401 may include sell size 419. Sell size 419 may be used to indicate a desire to bid or offer additional quantities of the financial instrument—e.g., in addition to the quantity indicated in area 411.

Figure 4B:
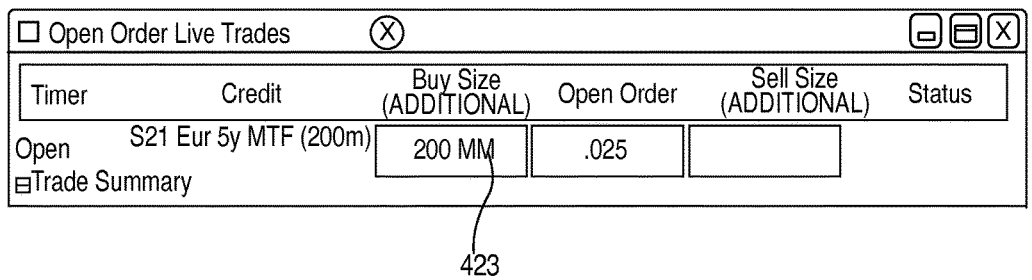

FIG. 4B may include some or all of the features of FIG. 4A.

FIG. 4B may include box 423. Box 423 may indicate a desire to bid for an additional quantity of the financial instrument, in addition to the amount already indicated in area 411 (see FIG. 4A).

Figure 5:
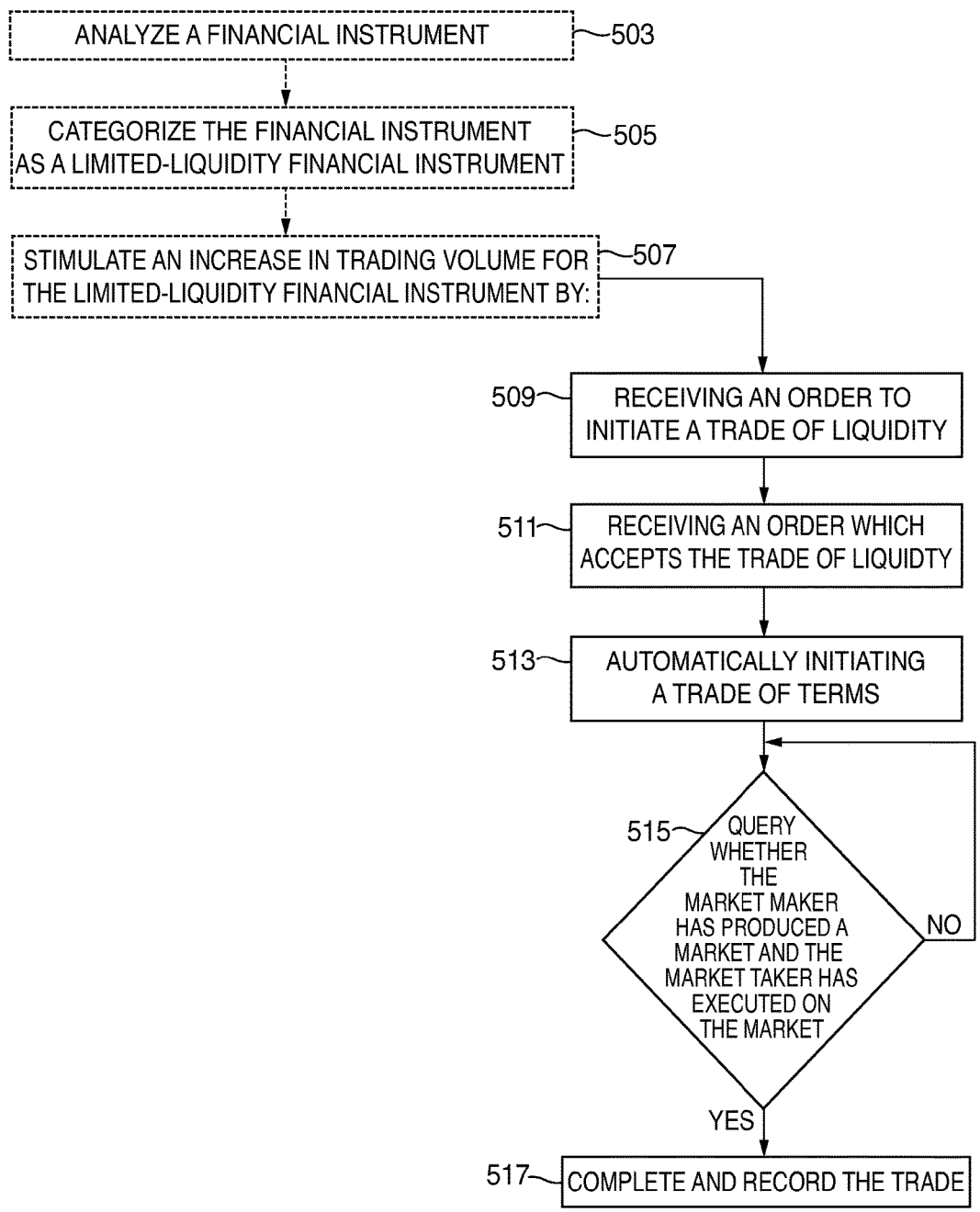
FIG. 5 shows an illustrative flow diagram in accordance with certain embodiments.

FIG. 5 shows an illustrative flow diagram 501.

Process 501 may begin at optional step 503. At step 503, the system may analyze one or more instruments. The instrument(s) may be a financial instrument.

At optional step 505, the system may categorize the financial instrument. The financial instrument may be categorized as a limited-liquidity financial instrument.

At optional step 507, the system may stimulate an increase. The increase may be an increase in volume. The volume may be trading volume. The volume may be the trading volume of the limited-liquidity financial instrument.

At step 509, the system may receive an order. The order may be an order to initiate a trade. The trade may be a trade of liquidity. The order may be received from a first entity. The order may be a bid. The bid for liquidity may be associated with a market taker. The order may be an offer. The offer for liquidity may be associated with a market maker.

At step 511, the system may receive an order. The order may accept the order in step 509.

The order may accept the trade of liquidity. The order may be received from a second entity. The order may be a bid. The order may be an offer.

Following acceptance of the trade of liquidity, at step 513, the system may initiate a trade of terms. The trade of terms may set the price of the transaction pursuant to the trade of liquidity. The trade of terms may set the size of the transaction pursuant to the trade of liquidity. The trade of terms may set any additional suitable terms of the transaction.

At step 515, the system may query whether the market maker has produced a market and the market taker has executed on the market. If the market maker has produced a market and the market taker has executed on the market then the system may complete and record the trade at 517.

Figure 6:
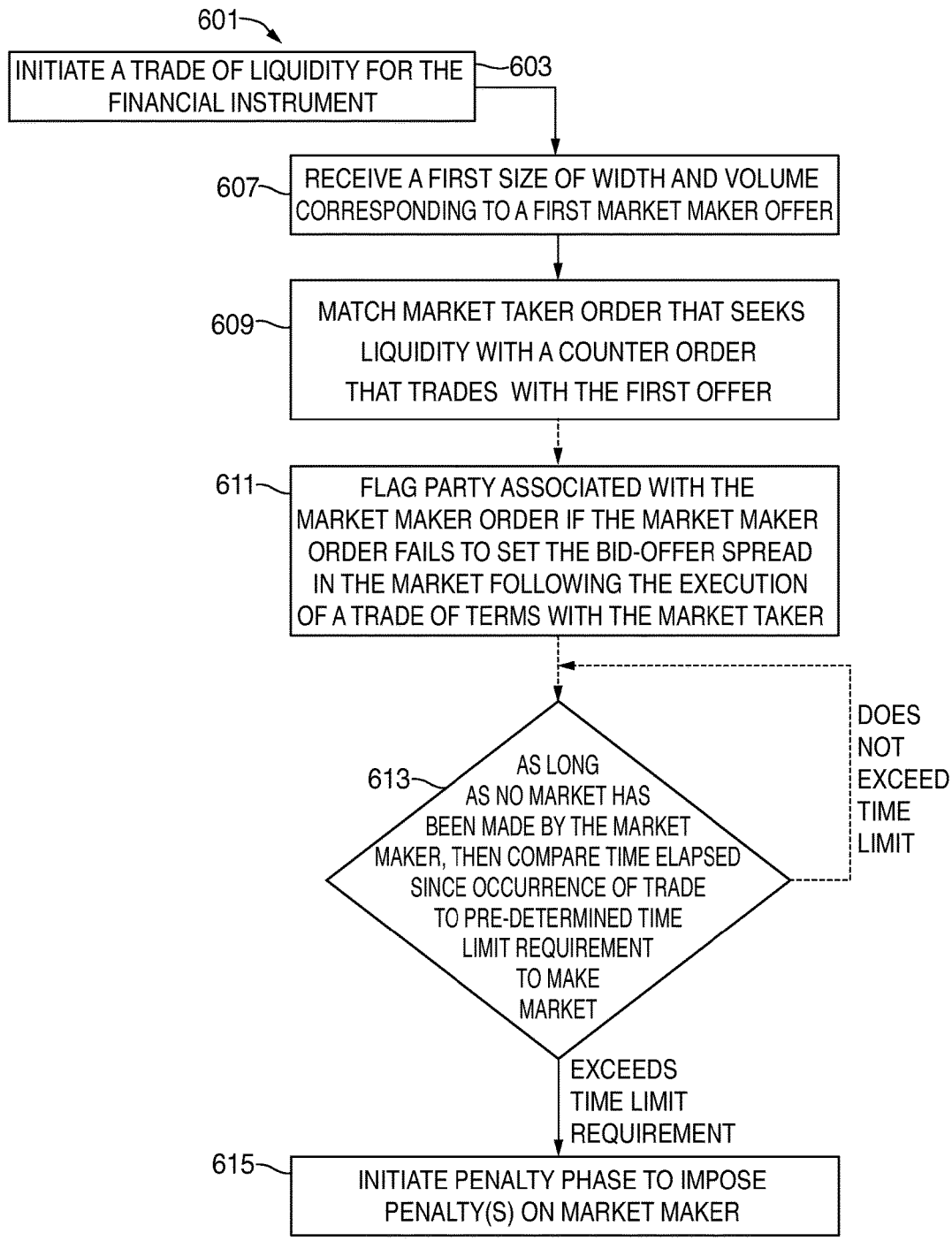
FIG. 6 shows another illustrative flow diagram in accordance with certain embodiments.

FIG. 6 shows an illustrative flow diagram 601.

Process 601 may begin at step 603. At step 603, the system may initiate a trade. The trade may be a trade of liquidity. The trade may be a trade of liquidity for a limited-liquidity financial instrument.

At step 607, the system may receive a size. The size may be a first size. The first size may correspond to an offer. The offer may be a first offer.

At step 609, the system may receive a counterorder. The counterorder may initiate a trade with the first offer. The counterorder may match with the first offer.

It should be noted that, while steps 607 and 609 appear in a particular order, the scope of the invention is not limited to the order set forth in FIG. 6. Rather, the scope of the invention includes embodiments in which the market maker enters his or her order first or the market taker enters his or her order first.

At step 611, the system may flag the party associated with the market maker order if the market maker order fails to set the bid-offer spread in the market following the execution of a trade of terms with the market taker.

The system may enforce the requirement for the market maker to make the market, as set forth in the query 613. As long as no market has been made by the market maker, then the system may compare the time elapsed since the occurrence of the trade of terms to a pre-determined time limit requirement to make the market. If the comparison determines that the time limit has not been exceeded, then the system may continue to compare the time limit to determine whether the time limit has been exceeded.

If the time limit has been exceeded, the system may initiate a penalty phase to impose a penalty on the market maker.

Figure 7:
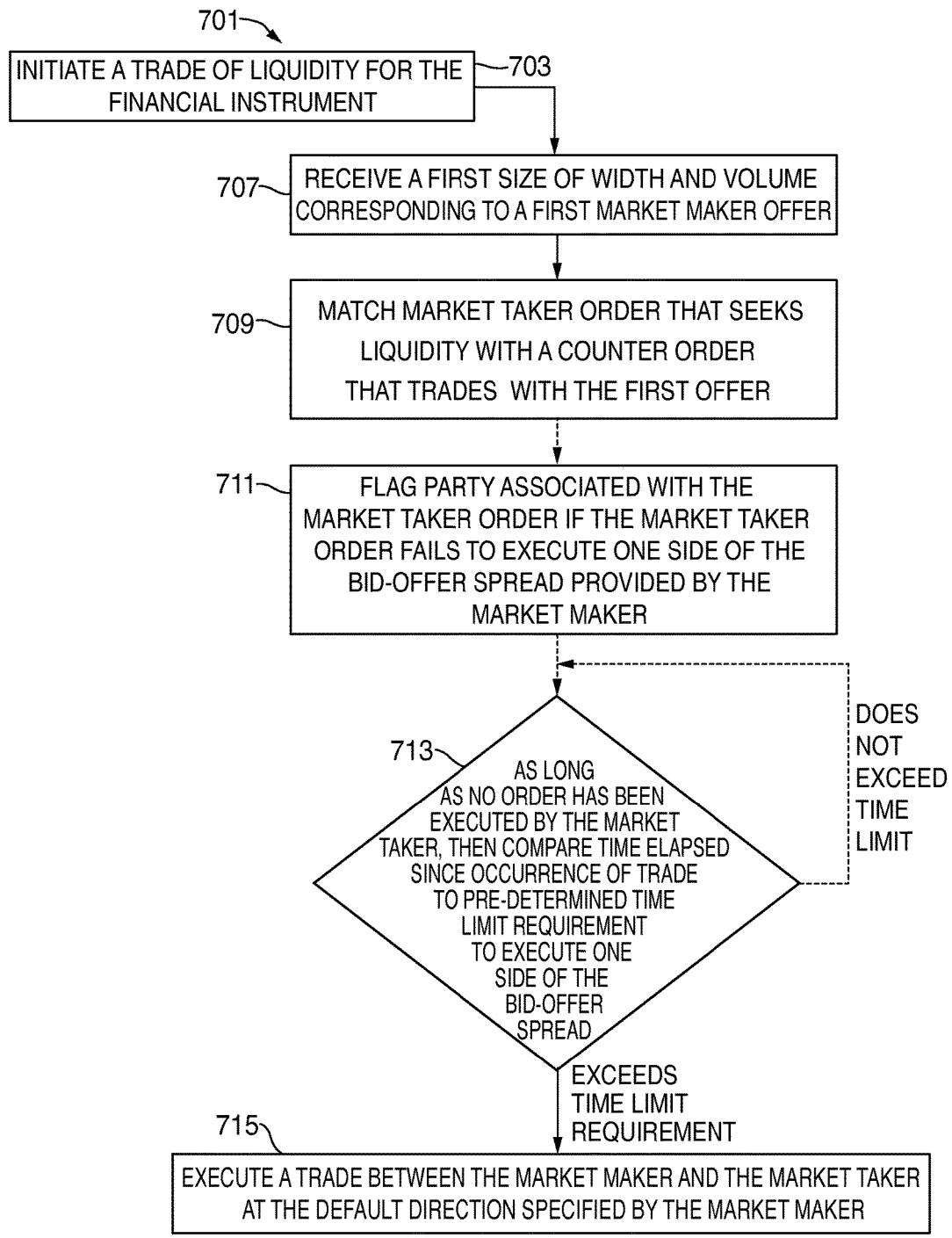
FIG. 7 shows yet another illustrative flow diagram in accordance with certain embodiments.

FIG. 7 shows another illustrative flow diagram in accordance with certain embodiments. Steps 703, 707 and 709 are substantially similar to steps 603, 607 and 609 shown in FIG. 6.

Step 711 shows that certain embodiments may flag a party associated with the market taker order if the market taker order fails to execute one side of the bid-offer spread provided by the market maker. In order to accomplish the flagging, the embodiments may, as shown in step 713, query whether an order has been executed by the market taker by comparing the time elapsed since occurrence of the liquidity trade to a pre-determined time limit requirement to execute one side of the bid-offer spread.

Step 715 shows that the system may, in certain embodiments, execute a trade between the market maker and the market taker according to a default direction specified by the market maker.

Figure 8:
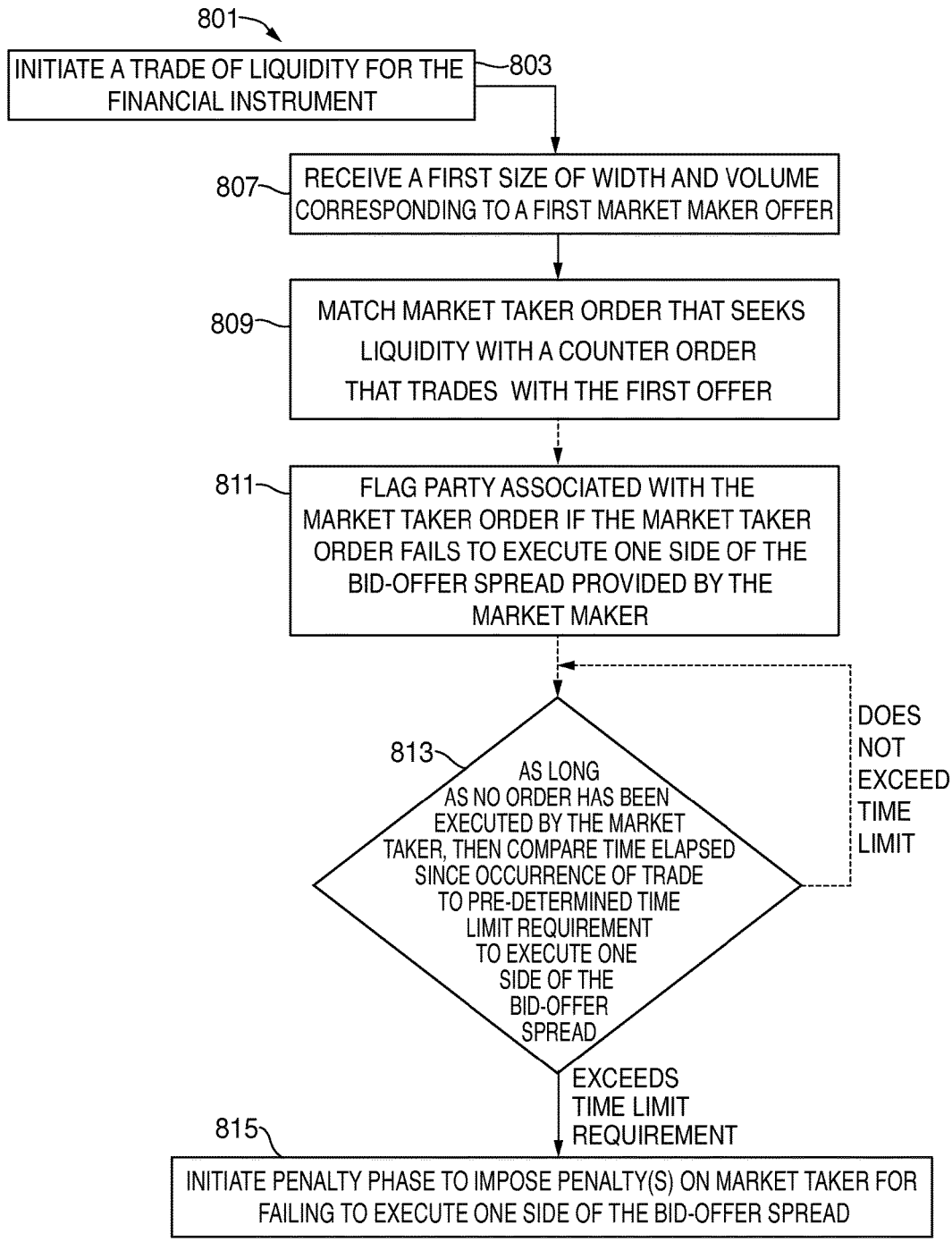
FIG. 8 shows still another illustrative flow diagram in accordance with certain embodiments.

FIG. 8 shows still another illustrative flow diagram for certain embodiments. Steps 803-813 are similar to steps 703-715 shows in FIG. 7. Step 815, however, shows initiating a penalty phase whereby the system preferably imposes a penalty on the market taker for failing to execute one side of the bid-offer spread. Such a penalty may be any suitable penalty such as, for example, restricting user participation rights, assessing a financial penalty on the user.

Figure 9:
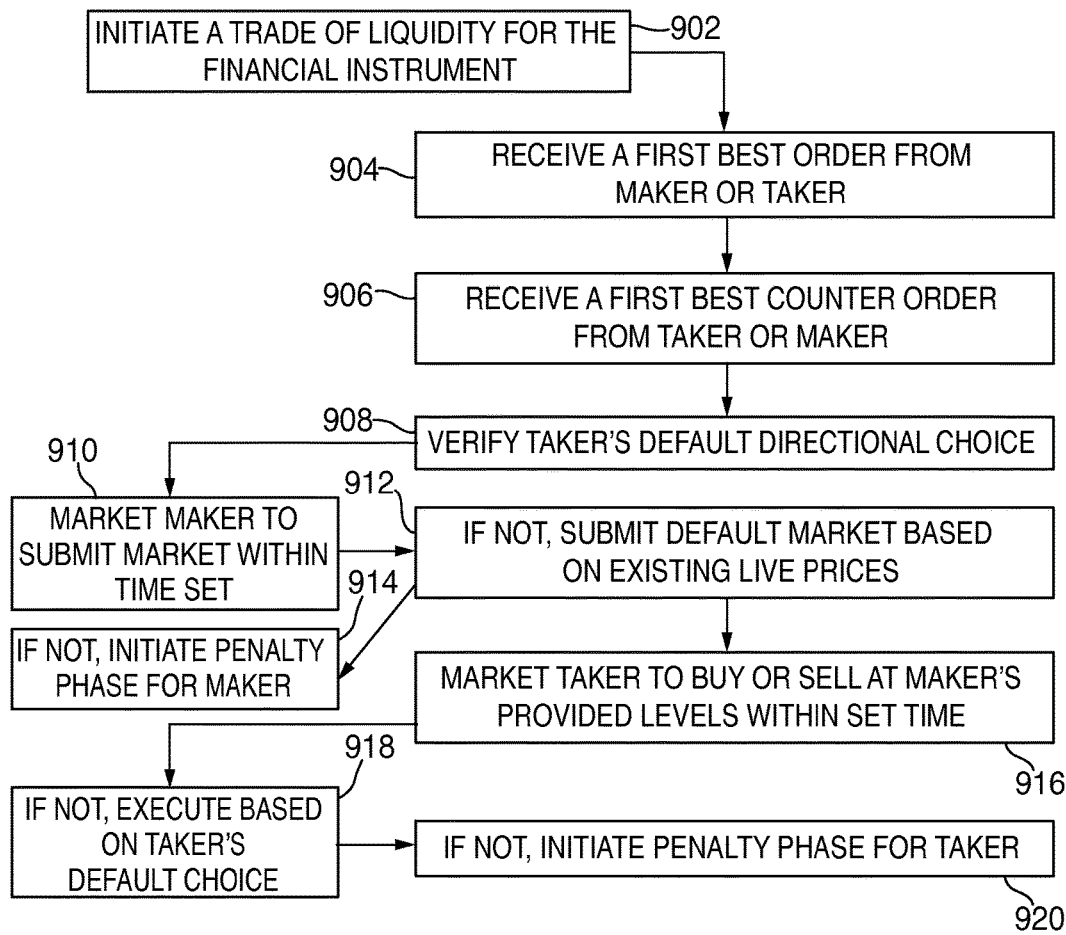
FIG. 9 also shows an illustrative flow diagram in accordance with certain embodiments.

FIG. 9 also shows an illustrative flow diagram in accordance with certain embodiments. FIG. 9 relates specifically to a matching/open matching version of the embodiments. Step 902 shows initiating a trade of liquidity for a pre-determined financial instrument. Step 904 shows receiving a first, best, order from a market maker or a market taker.

Step 906 shows receiving a first, best, counter order from a market taker or market maker.

In the embodiment shown in FIG. 9, the market taker's default directional choice is preferably verified.

At step 910, the market maker should preferably submit a market within a time set by the system. At step 912, if the market maker has not submitted a default market, then the system may preferably submit a default market based on existing live prices. In addition to submitting a default market based on existing live prices, the system may also initiate a penalty phase for penalizing the market maker.

Once the market maker has, either voluntarily or involuntarily, submitted a market, then step 916 shows that the market take should preferably decide whether to buy or sell at the maker's provided level(s) within a preferably system-set time.

Step 918 shows that if the market taker fails to execute, then the system may execute for him, preferably based on the market taker's pre-determined default selection. In addition, if the market taker fails to execute, and the system executes on his behalf, the system may also initiate a penalty phase for the taker, as shown at step 920 and as more fully described above.

The invention may be operational with numerous other special purpose computing system environments or configurations.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage encoded media including memory storage device.

One of ordinary skill in the art will appreciate that the elements shown and described herein may be performed in other than the recited order and that one or more elements illustrated may be optional. The methods of the above-referenced embodiments may involve the use of any suitable elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and apparatus for liquidity trading have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. A computer-implemented method for stimulating trading in a limited-liquidity financial instrument over a computer network having a server system and at least first and second computers, the method comprising:

receiving at said server a trade of liquidity for the limited-liquidity financial instrument, said receiving comprising:

receiving a first order from said computers, said first order corresponding to a price and volume associated with a pre-determined bid-offer spread, said order being executable only in conjunction with a counterorder that trades with the first order and includes a commitment to make a two-way market in the financial instrument at the pre-determined bid-offer spread and initiating a timer to keep track of time elapsed since occurrence of a trade of the financial instrument to a pre-determined time requirement to make a market: and:

comparing at said server a time elapsed since occurrence of a trade of the financial instrument to a predetermined time requirement to make a market: and if results of the comparison indicate that the time elapsed has exceeded the predetermined time requirement, then executing a process to (a) initiate a process to generate electronic commands to cause to submit a trade on a default market based on existing market prices, (b) to initiate a penalty phase to generate electronic commands to cause to impose a penalty on a user that has made the commitment to make a two-way market in the financial instrument at the predetermined bid-offer spread but that has failed to execute a trade on the commitment, and (c) execute a process to cause to generate electronic commands to impose restriction of participation rights on the user that has made the commitment but failed on the commitment.

2. The method of claim 1 further comprising:

analyzing the financial instrument;

categorizing the financial instrument as a limited-liquidity financial instrument, said categorization based, at least in part, on a determination that a liquid market that meets a predetermined liquidity threshold does not exist for the financial instrument; and stimulating an increase in trading volume for the limited-liquidity financial instrument, the stimulating comprising the receiving a trade of liquidity.

3. The method of claim 1 further comprising flagging the counterorder if the counterorder fails to set the bid-offer spread.

4. The method of claim 3 further comprising receiving a time limit requirement, said time limit requirement corresponding to the amount of time for which the counterorder is required to set the bid-offer spread.

5. The method of claim 1 wherein, when the first order is received from a first entity and the counterorder is received from a second entity, the method further comprises:

receiving a bid price and an offer price from the second entity; and obligating the first entity to select one of the bid and the offer and to execute a trade therewith, the execution for a size not less than the pre-determined size.

6. The method of claim 5 wherein the bid price and the offer price form the spread, and the bid price or the offer price is within a predefined price window of a mid-market level.

7. A computer-implemented method for stimulating trading in a limited-liquidity financial instrument over a computer network having a server system and at least first and second computers, the method comprising:

receiving at said server, a trade of liquidity for the limited-liquidity financial instrument, said receiving comprising:

receiving from said first computer, a first order, said first order corresponding to a price and volume associated with a pre-determined bid-offer spread, said order being executable only in conjunction with a counterorder that trades with the first order and includes a commitment to make a two-way market in the financial instrument at the predetermined bid-offer spread wherein, when the first order is received from a first entity and the counterorder is received from a second entity at said second computer, the method further comprises: receiving a bid price and an offer price from the second entity; and receiving an instruction from the first entity to select one of the bid and the offer and to execute a trade therewith, the execution for a size not less than the pre-determined size;

wherein, if the system fails to receive from a selection from the first entity within a predetermined period of time, the method further comprises (a) executing a trade based on a predetermined election by the second entity of a default trade direction, (b) initiating a penalty phase to generate electronic commands to cause to impose a penalty on a user associated with the commitment, and (c) executing a process to cause to generate electronic commands to impose restriction of participation rights on the user associated with the commitment.

8. The method of claim 7 further comprising:

analyzing the financial instrument;

categorizing the financial instrument as a limited-liquidity financial instrument, said categorization based, at least in part, on a determination that a liquid market that meets a predetermined liquidity threshold does not exist for the financial instrument; and stimulating an increase in trading volume for the limited-liquidity financial instrument, the stimulating comprising the receiving a trade of liquidity.

9. The method of claim 7 further comprising flagging the counterorder if the counterorder fails to set the bid-offer spread within a pre-determined time limit requirement.

10. The method of claim 9 further comprising receiving the time limit requirement, said time limit requirement corresponding to the amount of time for which the counterorder is required to set the bid-offer spread.

11. The method of claim 7 wherein, when the first order is received from a first entity and the counterorder is received from a second entity, the method further comprises:

receiving a bid price and an offer price from the second entity; and receiving an instruction from the first entity to select one of the bid and the offer and to execute a trade therewith, the execution for a size not less than the pre-determined size.

12. The method of claim 11 wherein the bid price and the offer price form the spread, and the bid price or the offer price is within a predefined price window of a mid-market level.

* * * * *